(12) United States Patent
Borzym

(10) Patent No.: US 6,752,055 B2
(45) Date of Patent: Jun. 22, 2004

(54) TURRET TYPE PRODUCT RECEIVER/ UNLOADER FOR SLUGLESS SHEAR

(76) Inventor: John J. Borzym, 888 Andover, Northville, MI (US) 48167

( * ) Notice: Subject to any disclaimer, the term of this patent is extended or adjusted under 35 U.S.C. 154(b) by 308 days.

(21) Appl. No.: 09/852,887

(22) Filed: May 8, 2001

(65) Prior Publication Data

US 2002/0166426 A1 Nov. 14, 2002

(51) Int. Cl.⁷ ................................................. B26D 7/06
(52) U.S. Cl. ................................. 83/29; 83/54; 83/178; 83/161
(58) Field of Search ...................... 83/29, 54, 178–195, 83/161, 158–160, 155, 155.1; 414/27, 1

(56) References Cited

U.S. PATENT DOCUMENTS

| | | | | |
|---|---|---|---|---|
| 771,752 A | * | 10/1904 | Stafford | 83/124 |
| 2,412,930 A | * | 12/1946 | Walklet | 83/127 |
| 3,195,444 A | * | 7/1965 | McLean | 100/7 |
| 3,263,882 A | * | 8/1966 | Nugent et al. | 225/2 |
| 3,946,884 A | * | 3/1976 | Kato et al. | 414/800 |
| 4,205,569 A | * | 6/1980 | Horn et al. | 83/82 |
| 4,306,826 A | * | 12/1981 | Detwiler | 414/27 |
| 4,426,899 A | * | 1/1984 | Long et al. | 83/188 |
| 4,456,417 A | * | 6/1984 | Gerding | 414/745.2 |
| 4,510,830 A | * | 4/1985 | Post | 83/114 |
| 4,631,998 A | | 12/1986 | Borzym | |
| 4,635,514 A | | 1/1987 | Borzym | |
| 4,641,555 A | * | 2/1987 | Johnson et al. | 83/29 |
| 4,889,023 A | * | 12/1989 | Languillat | 83/54 |
| 5,890,346 A | * | 4/1999 | Guess | 53/459 |

* cited by examiner

Primary Examiner—Allan N. Shoap
Assistant Examiner—Omar Flores-Sánchez
(74) Attorney, Agent, or Firm—Young & Basile P.C.

(57) ABSTRACT

A turret assembly for receiving and holding lengths of re-cut tubing cut or sheared from a longer-length workpiece by a re-cut device. The turret assembly includes a motor, a plate and a plurality of accumulator members. The accumulator members are supported by the plate in essentially parallel, spaced-apart relationship to receive a predetermined quantity of lengths of re-cut tubing from the re-cut device. The plate is rotated by the motor. A stripping device having a stripping collar and a linear actuator can strip tubing from the accumulator members. A stacking element can collect stripped tubing from the accumulator members and stack tubing in a container.

18 Claims, 3 Drawing Sheets

TURRET TYPE PRODUCT RECEIVER/ UNLOADER FOR SLUGLESS SHEAR

FIELD OF THE INVENTION

This invention relates to tube cutting and stacking and, more specifically, to a system for accumulating lengths of tubing cut from a longer-length workpiece and efficiently transferring the cut lengths to, for example, a stacking position in such a way as to cause minimal delay in the cutting operation.

BACKGROUND OF THE INVENTION

Tubing is commonly manufactured in a continuous, high speed operation involving the steps of forming and seam welding metal strip stock. At the end of the operation, the tube is cut into manageable lengths of, for example, twenty feet. Fabricators typically purchase these lengths in bundles and cut them into shorter lengths according to the dimensions of the products to be fabricated from them. This is commonly referred to as a "re-cut" operation.

Re-cutting can be accomplished in several ways including pinch rollers, guillotine type cutters, and saws. Another method which is incorporated into this disclosure as a preferred method is disclosed by U.S. Pat. No. 4,635,514 to Alexander Borzym. Borzym discloses a shearing apparatus where a tube is held by two axially adjacent dies. As the dies translate relative to each other, the tube is parted along a shear plane defined by the mating faces of the two dies. A mandrel can be positioned within the tubing to prevent collapse of the tube walls during the shearing process. The advantages of this shearing method include speed and the elimination of the generation of debris and slugs associated with saws and guillotine cutters, respectively.

After a longer-length workpiece has been re-cut, each of the smaller lengths of cut tube is collected. One method of collecting short lengths of cut tube from the types of cutting devices listed above is to accumulate them on a rod-like element immediately downstream of the shearing location, i.e., the accumulator rod is positioned so that the cut lengths of tubing are loaded in series onto the rod until it is filled to capacity. Once the accumulator element is completely loaded, the tube shearing process must be stopped so the accumulator element can be removed, stripped and put back into position to resume the accumulation of cut lengths.

SUMMARY OF THE INVENTION

An object of the present invention is to provide an apparatus for accumulating lengths of cut tubing in such a way as to substantially reduce delay and loss of production time associated with stripping the accumulator element. This objective is achieved by providing multiple accumulator elements and moving these between accumulating and stripping stations in an efficient fashion. The multiple accumulator elements can, for example, be supported in parallel, spaced-apart relationship by movable support means such as a turret which is rotatable on command to move a loaded element out of the accumulating station as another empty element is moved in.

While this objective can be achieved using two accumulator elements, it is preferred to use three so that one element is in the accumulating or receiving station while another is in a stripping station and still another is in a waiting station. As a result, the shearing process is not unduly delayed by the translation, stripping and repositioning of a single accumulator element.

The present invention also provides clearing means for removing cut lengths from an accumulator element. When a full accumulator element is moved away from the accumulating station to a clearing or stripping station, a stripper can be engaged to clear the lengths of re-cut tubing from a free end of the accumulator element.

The present invention also provides collecting and stacking means to collect lengths of tubing stripped from an accumulator member and transfer them in predetermined numbers to a stacking station which may include a carton for shipping the cut lengths.

The aspects of the invention thus far described can be enjoyed in combination with any of the various types of re-cutters described above. The aspects of the invention described in the following section can only be used with a supported shear of the specific type described in Borzym '514.

In the preferred form, the present invention also provides a sensor and control means to ensure that shearing only takes place when an internal die or mandrel is in the proper position. The accumulator element at the accumulating station abuts the mandrel and prevents downstream movement. A sensor can be positioned at the free end of the accumulator element to sense the presence or absence of the mandrel relative to the accumulator element. The sensor can emit a signal to a control means to stop the shearing operation if the mandrel is not positioned as desired.

The present invention also provides a sensor for sensing a quantity of lengths of re-cut tubing received by the accumulator element. The invention includes control means for controlling the displacing means based on the quantity of lengths of re-cut tubing received by the accumulator element. Specifically, when the accumulator element has received a predetermined quantity of lengths of re-cut tubing, the sensor emits a signal to control means to displace the accumulator element, then at the receiving position, to the clearing position. Contemporaneously, the displacing means moves a second accumulator element into the accumulating station.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 4 is an isometric view of the overall system showing a stacking apparatus for receiving and handling lengths of re-cut tubing.

DESCRIPTION OF THE PREFERRED EMBODIMENT

Figure 1:
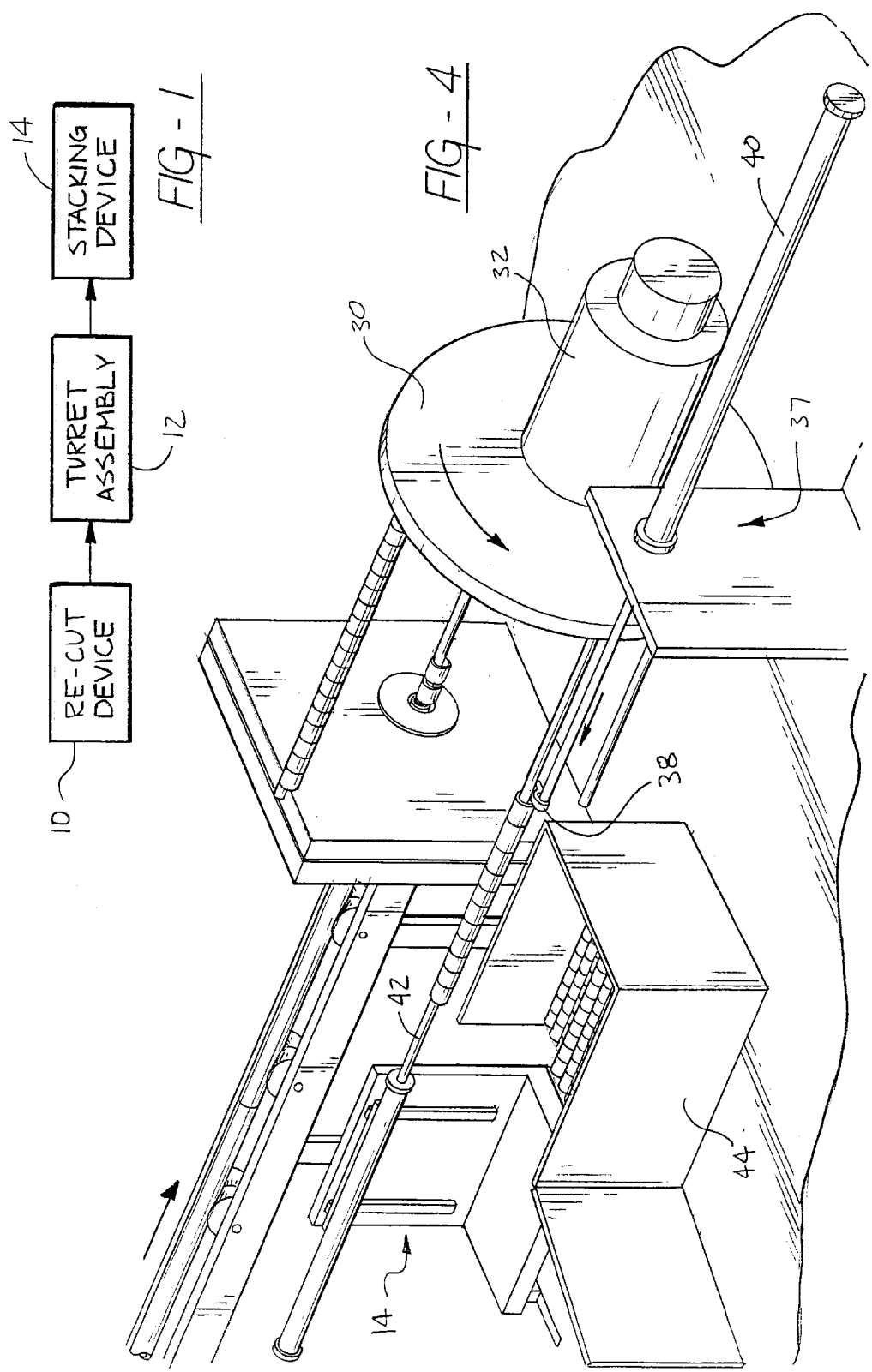
FIG. 1 is a block diagram illustrating the system of re-cutting, receiving and collecting lengths of tubing.

The invention provides a system for collecting, stacking and packaging lengths of tubing re-cut from a longer-length workpiece. As shown in FIG. 1, the system includes a re-cut device 10, a turret assembly 12 and a stacking device 14. The re-cut device 10 is preferably a supported shear of the type disclosed in Borzym '514 capable of receiving lengths of, for example, steel tubing and cutting those lengths into multiple, shorter lengths of cut tubing. The shorter lengths of re-cut tubing are discharged by the re-cut device 10 and received by the turret assembly 12 the function of which is to substantially continuously accumulate the cut lengths and transfer them without substantial interruption to a stacking device 14. As herein after described, the stacking device 14 collects and stacks the lengths of re-cut tubing 16 in a specifically prepared carton or container.

Figure 2:
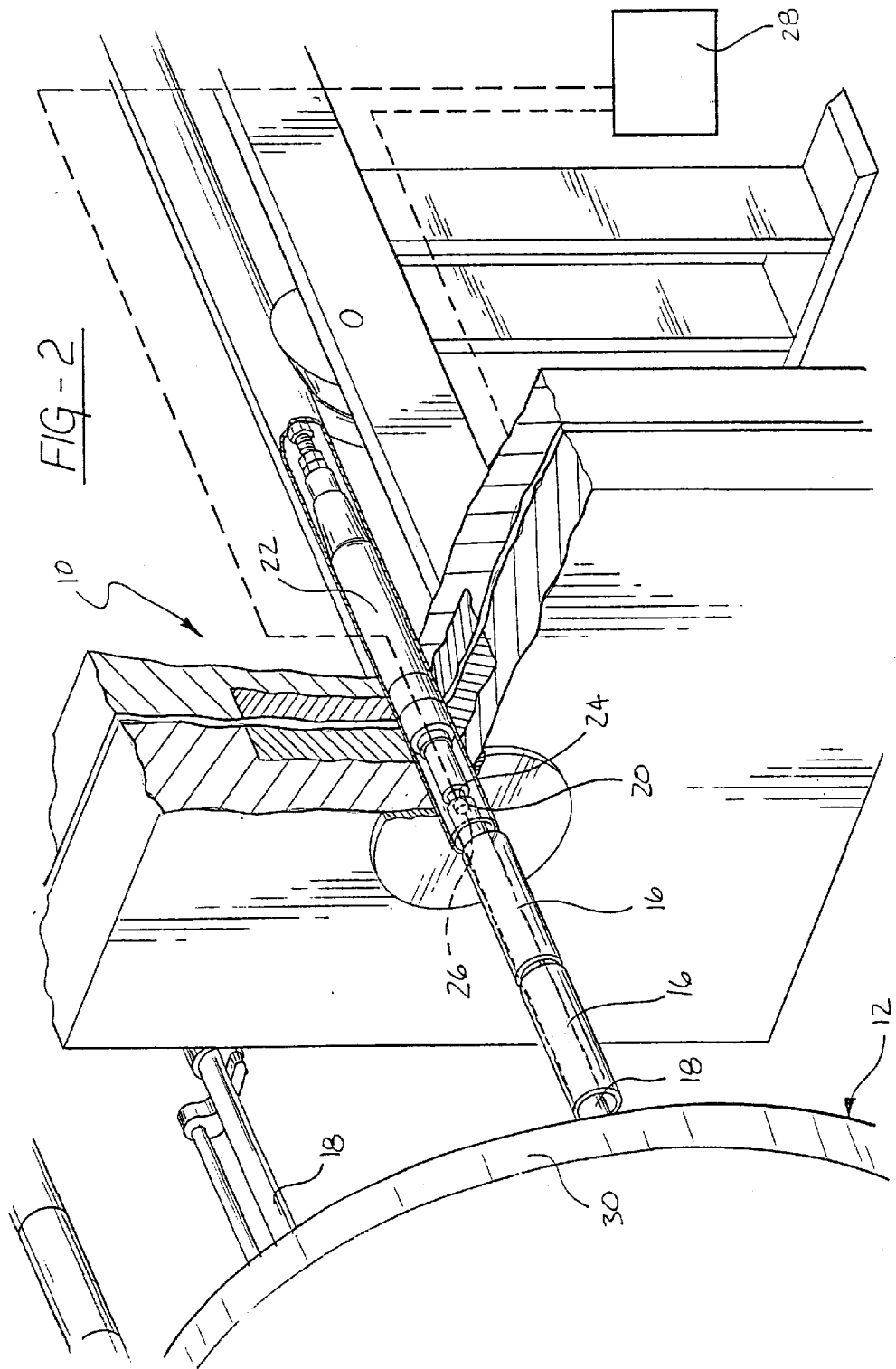
FIG. 2 is an isometric view of a re-cut device and turret assembly.

As shown in FIG. 2, lengths 15 of tubing are fed toward the shear apparatus 10 over a table 17 with rollers 19 and an appropriate drive system, not shown. The drive is, of course, intermittent such that the shearing dies 21, 23 can be displaced relative to one another to part or shear the length 15 into lengths 16 of desired dimension. The lengths 16 are received by the turret assembly 12 and accumulated on rod-like accumulator elements 18 each having one end secured to a rotary turret 30. The rods 18 are preferably arranged at a constant radius from the turret center and at uniform 120° intervals to define three stations: an accumulating station, a stripping station and a waiting station. Each accumulator rod 18 is adapted to receive at least one length of re-cut tubing 16 but more typically three or more.

In operation, as lengths of re-cut tubing 16 are discharged intermittently from the re-cut device 10, they are accumulated on the rod 18 which is in the accumulating station; i.e., adjacent and in alignment with the output axis of the re-cut device 10. The cross-section and length of the accumulator member 18 can be of adjusted according to the configuration of the lengths of re-cut tubing 16. Specifically, if the lengths of re-cut tubing 16 are elliptical in cross section, the accumulator member 18 can be elliptical in cross section. If the lengths of re-cut tubing 16 are thick-walled, the accumulator member 18 can be of a relatively thick cross section to support the weight of the relatively heavy lengths of re-cut tubing 16. If the lengths 16 are solid, long trays can be pivotally mounted to turret 30 to remain upright as the turret is rotated. In the embodiment of the invention of FIG. 2, the shearing device 10 has a mandrel 22 and the free end 20 of the accumulator rod 18 is positioned to contact the downstream end 24 of the mandrel 22 to maintain the mandrel 22 in the proper location and prevent downstream movement of the mandrel 22 due to frictional engagement with the tube 15. The accumulator rod 18 includes a sensor 26 positioned at the free end 20. The sensor 26 detects the position of the free end 20 relative to the position of the downstream end 24 of the mandrel 22. The sensor 26 emits a signal based on the position of the free end 20 with respect to the downstream end 24. A control means 28, such as an electric control circuit, is provided to receive the signal from the sensor 26 and control the operation of the re-cut device 10. In particular, if the sensor 26 senses that the mandrel 22 is improperly positioned relative to the shear plane between the dies 21, 23, the control means 28 stops the operations of the re-cut device 10. The sensor 26 is a proximity sensor and the proper position of the mandrel 22 is immediately adjacent the free end 20. It will be apparent to skilled persons familiar with the '514 patent that the proper position of the mandrel is one in which the interface plane between the radially movable parts of the mandrel coincides exactly with the shear plane.

Figure 3:
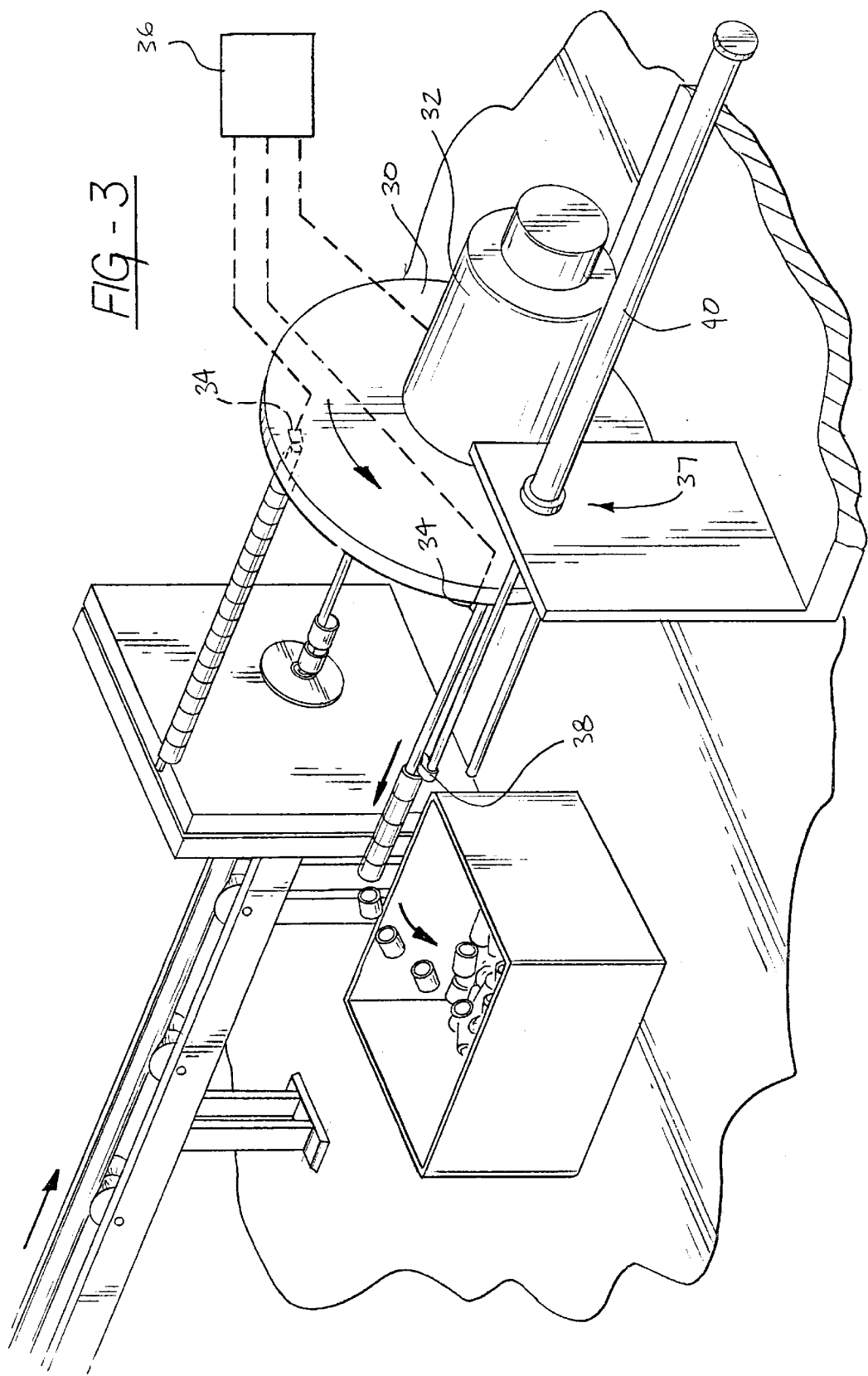
FIG. 3 is an isometric view of the stripping means of the invention stripping lengths of re-cut tubing from an accumulator element at the second position.

As better shown in FIG. 3, the accumulator rods 18 are supported in essentially parallel, uniform spaced-apart relationship. The plurality of accumulator members 18 are preferably positioned absolutely parallel with each other but may lie at an angle relative to each other. For example, the accumulator rods 18 can be engaged with the turret 30 at an outward angle relative to the plate but they must all occupy the same position and have the same orientation when they are in a given station. A non-parallel arrangement, similar to the legs of a stool, can be employed to place the rods 18 in a downward angle when in the stripping station thus to gain a gravity assist in the stripping operation. In the illustrated embodiment, the rods 18 are horizontal and parallel. The accumulator rods 18 can be disengageably associated with turret 30, or may be permanently engaged to the turret 30 such as by welding. For example, the accumulator rods 18 may have threaded ends that screw into threaded apertures in a turret 30.

Looking now to FIG. 3, the turret 30 is rotated through an angle of 120° each time the rod 18 in the accumulating station is filled. Rotation is accomplished by a motor 32 which can be hydraulic, electric or pneumatic. A sensor 34 detects the quantity of lengths 16 received by the accumulator rod 18. The sensor 34 can be positioned on the turret 30 or on the accumulator rod 18 and emits a signal whenever the rod 18 at the accumulating station is filled. Any of various electro-optical or electro-mechanical limit switches will suffice. Control means 36 are provided for receiving the signal from the sensor 34 and controlling the operation of the motor 32. For example, when the accumulator rod 18 at the accumulating station has received a predetermined quantity of lengths 16, the control means 36 can control the motor 32 to rotate the turret 30 and bring the full accumulator rod 18 to a stripping station 37 while an empty rod 18 is moved from a waiting station to the accumulating station. The control means 36 can also be operably interfaced with the re-cut device 10 such that when control means 36 receives a signal from the sensor 34 and controls the motor 32 to move the full accumulator rod 18, the re-cut device 10 cannot be engaged. Control means 36 is preferably a microprocessor-type controller operating on a control program but may also be hard-wired.

The turret 30 can be formed in any geometric configuration. In a preferred embodiment of the invention, the turret 30 is circular. The material and thickness of the turret 30 are a function of the number of accumulator members 18 used, the material of the accumulator members 18, and the size of the lengths 16 being cut. For example, lengths of re-cut tubing 16 that are relatively thick in diameter and wall thickness will require relatively sturdier, or thicker, accumulator members 18 and thicker turret 30.

As shown in FIG. 3, the illustrative embodiment includes a stripping station 37 for stripping lengths 16 from the accumulator rod 18. The stripping station 37 includes a stripping collar 38 to engage the lengths 16 and drive them off of the rod 18 and into a carton 39. The stripping collar 38 is operably associated with a linear actuator 40. The linear actuator 40 is preferably a hydraulic cylinder but may also be a pneumatic cylinder or an electric linear actuator. The linear actuator 40 directs the stripping collar 38 toward the free end 20 of the accumulator rod 18 to drive lengths 16 off of the free end 20.

As shown in FIG. 4, the illustrative embodiment also includes a stacking apparatus 14. In fact, a particular arrangement may include more than one stacking apparatus 14. The stacking apparatus 14 includes a stacking element 42 that can be configured similar to the accumulator rod 18. The stacking element 42 is positioned adjacent and in alignment with the free end 20 of the accumulator rod 18 at the stripping station 37 to receive lengths 16 stripped from the accumulator rod 18. The stacking element 42 is movable in three dimensions from the stripping station 37 to a stacking station where a carton 44 is waiting. When the stacking element 42 has received a predetermined quantity of lengths of re-cut tubing 16, the stacking element 42 can be moved from the stripping station 37 to a position over or in the carton 44. The predetermined quantity received by the stacking element 42 can be equal to the quantity received by one or more accumulator rods 18. The container 44 is open on one side so the stacking element 42 can be lowered into the carton 44.

In operation, the stacking element 42, carrying at least one length of re-cut tubing 16, is lowered into the carton 44 until the lengths 16 rest on the carton bottom or on top of lengths 16 already in the carton. When this occurs, the stacking element 42 no longer contacts the inside surface of the lengths 16 and can be retracted out of the carton 44 and out of the lengths 16. The container 44 can be filled with lengths 16 in this manner. The stacking element 42 can be moved by belt driven linear actuators such as the MKR series of actuators made by Star Manufacturing of Charlotte, N.C. The stacking element 42 can be moved by servo drive devices having microprocessors. Such microprocessors can receive dimensional coordinates to move the stacking element 42 between the second position and multiple stacking positions.

In the operation of a preferred system of re-cutting according to the present invention, a longer-length workpiece is directed to a shearing re-cut device 10. At the shearing re-cut device 10, a mandrel 22 is positioned within the length 15. The shearing re-cut device 10 completes a shearing operation on the length 15 and forms a length 16. The length 16 is directed away from the re-cut device 10 at the accumulating station by the continued feed of length 15 into the re-cut device 10. An accumulator rod 18 of a turret assembly 12, at the accumulating station receives and holds the lengths 16. The operation of the shearing re-cut device 10 continues to produce another length 16 that is also received by the accumulator rod 18. The accumulator rod 18 receives and holds a predetermined quantity of lengths of 16 and a sensor 34 emits a signal to control means 36 when this quantity has been received. The control means 36 controls the motor 32 to rotate turret 30 and controls re-cut device 10 to suspend shearing operations. The full accumulator rod 18 initially at the accumulating station is exchanged for a second, empty accumulator rod 18 by the rotation of the turret 30. The full accumulator rod 18 moves from the accumulating station to the stripping station 37 and the second accumulator rod 18 moves from a waiting position to the accumulating station. When the rotation of the turret 30 ceases, the shearing re-cut device 10 resumes shearing operations to produce additional lengths 16. Contemporaneously, the stripping station 37 engages the lengths 16 held by the full accumulator rod 18. A stripping collar 38, driven by a linear actuator 40, directs lengths 16 off the free end 20 of the accumulator rod 18. As the lengths 16 are directed off the accumulator rod 18 at the stripping station 37, they are received by a stacking element 42. When all of the lengths 16 have been stripped from the accumulator rod 18 at the stripping station 37, the stacking element 42 moves from the stripping station 37 to a stacking position. The stacking element 42 disengages from the lengths 16 and retracts from the lengths 16 to return to the stripping station 37.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A method for receiving multiple lengths of cut tubing from a shearing device and transferring said multiple cut lengths simultaneously to a second location comprising the steps of:

receiving in sequence and holding multiple lengths of cut tubing in longitudinally stacked relationship with each of a plurality of accumulator members in sequence wherein each accumulator member is adapted to receive and hold multiple lengths of cut tubing in longitudinally stacked relationship thereon;

supporting the accumulator members in essentially parallel, spaced-apart relationship to one another;

displacing said members in sequence into a first position to receive said multiple cut lengths thereon from said shearing device and thereafter to a second position at which said cut lengths are stripped from said members; and operating a stripper which is disposed in fixed spatial relationship at said second position to strip said multiple cut lengths from members at said second position.

2. The method of claim 1 further comprising the steps of:

receiving and holding lengths of cut tubing which are stripped from the accumulator members with at least one stacking apparatus adapted to receive and hold the lengths which are stripped from the accumulator members.

3. The method of claim 1 further comprising the steps of:

determining a quantity of parts engaged by the member with a sensor; and controlling the exchanging means to exchange the member with another when the member has engaged a particular quantity of parts with an electronic control unit based on a control program stored in memory.

4. An apparatus for receiving lengths of metal tubing from a shearing device comprising:

a plurality of accumulator members each adapted to receive and hold lengths of cut tubing;

means for supporting the accumulator members in spaced-apart relationship; and means for displacing said members in sequence into a first position to receive said cut lengths from said shearing device and a second position at which said cut lengths are stripped from said members;

said apparatus further including a shearing device defining a shearing location and having a mandrel positioned within the tube in the shearing location and further wherein each accumulator member is operable to limit movement of the mandrel relative to the shearing location.

5. The apparatus of claim 1 further comprising:

means associated with said second position for stripping the lengths from the accumulator members.

6. The apparatus of claim 1 further comprising:

at least one stacking apparatus adapted to receive and hold the lengths which are stripped from the accumulator members.

7. The apparatus of claim 1 further comprising:
a sensor for detecting that an accumulator member is fully loaded and for producing a signal representing the fully loaded condition.

8. The apparatus of claim 7 further comprising:
means for receiving the signal and controlling the displacing means to move the accumulator member from the first position in response to the signal.

9. The apparatus of claim 1 further comprising:
a sensor for determining if the accumulator member at the first position is contacting the mandrel and emitting a signal based on this determination.

10. The apparatus of claim 9 further comprising:
means or receiving the signal and stopping the shearing device if the mandrel is spaced apart from the accumulator member.

11. An apparatus for receiving lengths of cut tubing from a shearing device defining a shearing location comprising:
a plurality of accumulator members each adapted to receive and hold lengths of cut tubing;
means for supporting the accumulator members in spaced-apart relationship;
means for displacing said members in sequence into a first position to receive said cut lengths from said shearing device and a second position at which said cut lengths are stripped from said members; and
means associated with said second position for stripping the lengths from the accumulator members;
said apparatus further comprising a shearing device defining a shearing location and a mandrel normally disposed at the shearing location, said shearing device being disposed in operable association with said accumulator members;
a sensor for determining if the accumulator member at the first position is contacting the mandrel and emitting a signal based on this determination; and
means for receiving the signal and stopping the shearing device if the mandrel is spaced apart from the accumulator member.

12. The apparatus of claim 11 wherein the supporting means further comprises:
a rotatable plate having an axis of rotation and a mounting surface, each accumulator member engaged with mounting surface and the mounting surface directed towards the shearing device.

13. The apparatus of claim 11 wherein the displacing means further comprises:

a motor chosen from the group consisting of a hydraulic motor, an electric motor and a pneumatic motor, the motor for rotating the plate about the rotation axis.

14. The apparatus of claim 11 wherein the stripping means further comprises:
a stripping collar engageable with the accumulator member at the second position; and
a linear actuator for directing the stripping collar from a position on the accumulator member adjacent to the supporting means towards a free end of the accumulator member to disengage the lengths engaged with a accumulator member.

15. The apparatus of claim 11 further comprising:
at least one stacking apparatus adapted to receive and hold the lengths which are stripped from the accumulator members.

16. The apparatus of claim 15 wherein the stacking means further comprises:
a rod for receiving the lengths stripped from the accumulator member at the second position;
means for moving the rod away from the second position.

17. The apparatus of claim 11, further comprising:
a sensor for determining a quantity of lengths held by the accumulator member and emitting a signal based on the quantity; and
means for receiving the signal and controlling the displacing means to move the accumulator member from the first position in response to the signal.

18. An apparatus for transferring multiple lengths of metal tubing from a shear to a second location comprising:
a rotatable support member;
a plurality of accumulator rods extending from said support member in parallel, spaced-part relationship, each of said rods being of sufficient length to receive and temporarily hold multiple cut lengths of said tubing thereon in longitudinally stacked relationship;
means for rotating said support member between a first position in which one of said rods receives multiple lengths from the shear in sequence and a second position in which a second of said rods receives multiple lengths and said one rod deposits all of the multiple lengths accumulated thereon at the second location; and
stripper means separate from said rods and support means and disposed in fixed spatial relationship at said second location for stripping the multiple cut lengths from the rods at the second location.

* * * * *